(12) United States Patent
Lombez et al.

(10) Patent No.: US 11,231,323 B2
(45) Date of Patent: Jan. 25, 2022

(54) TIME-RESOLVED HYPER-SPECTRAL SINGLE-PIXEL IMAGING

(71) Applicants: Centre National de la Recherche Scientifique, Paris (FR); Institut Photovoltaïque d'Ile-de-France, Antony (FR); Ecole Polytechnique, Palaiseau (FR); Total, Courbevoie (FR); EDF, Paris (FR)

(72) Inventors: Laurent Lombez, Nanterre (FR); Adrien Bercegol, Toulouse (FR); Daniel Ory, Fontenay-aux-Roses (FR)

(73) Assignees: Centre National de la Recherche Scientifique, Paris (FR); Institut Photovoltaique d'Ile-de-France, Anthony (FR); Ecole Polytechnique, Palaiseau (FR); Total, Courbevoie (FR); EDF, Paris (FR)

( * ) Notice: Subject to any disclaimer, the term of this patent is extended or adjusted under 35 U.S.C. 154(b) by 39 days.

(21) Appl. No.: 16/876,552

(22) Filed: May 18, 2020

(65) Prior Publication Data

US 2020/0370959 A1     Nov. 26, 2020

(30) Foreign Application Priority Data

May 20, 2019   (EP) ..................................... 19315037

(51) Int. Cl.
*G01J 3/28*         (2006.01)
*G01J 3/02*         (2006.01)

(52) U.S. Cl.
CPC ........... *G01J 3/2823* (2013.01); *G01J 3/0229* (2013.01)

(58) Field of Classification Search
CPC .................. G01J 3/2823; G01J 3/0229; G01J 2003/2826
See application file for complete search history.

(56) References Cited

U.S. PATENT DOCUMENTS

2017/0163971 A1* 6/2017 Wang ...................... G01S 17/10
2017/0176338 A1* 6/2017 Wu ........................ G01J 3/2823
(Continued)

FOREIGN PATENT DOCUMENTS

GB          2 231 958 A       11/1990

OTHER PUBLICATIONS

Rousset, et al., "Time-resolved multispectral imaging based on an adaptive single-pixel camera", Optics Express, vol. 26, Issue 8, pp. 10550-10558, (2018).
(Continued)

*Primary Examiner* — Maurice C Smith
(74) *Attorney, Agent, or Firm* — BakerHostetler (57) ABSTRACT

A time-resolved hyper-spectral imaging system for imaging a sample, includes a radiation source suitable for illuminating the sample repeatably, a first optical system configured to form an image I of the sample on a spatial light modulator forming a transmission or reflection mask P, a processor connected to the spatial light modulator and configured to make the transmission or reflection mask P vary for each repetition of the illumination, a second optical system suitable for focusing the radiation transmitted or reflected by the spatial light modulator so as to form, in its image focal plane, a partial image S=P·I; the imaging system being wherein it comprises: a dispersive device comprising a slit placed in the image focal plane of the second optical system, the dispersive device being suitable for spatially splitting the various wavelengths of the radiation transmitted or reflected by the spatial light modulator; a streak camera arranged so as to be illuminated by the radiation issuing from the dispersive device and configured to acquire a plurality of time-resolved partial images of the sample, the images being associated with respective and different transmission or reflection masks P, the streak camera being connected to the
(Continued)

processor and the processor also being configured to combine the partial images of the sample so as to construct a 4D image cube $I_{tot}$ forming an image resolved in time and in wavelength of the sample; and corresponding time-resolved hyper-spectral imaging method for imaging a sample.

12 Claims, 4 Drawing Sheets

(56) References Cited

U.S. PATENT DOCUMENTS

2017/0276545 A1* 9/2017 Henriksson ............... G06T 9/00
2018/0224552 A1   8/2018 Wang et al.

OTHER PUBLICATIONS

Liang, et al., "Encrypted three-dimensional dynamic imaging using snapshot time-of-flight compressed ultrafast photography", Scientific reports 5, 15504, (2015).
Gao, et al., "Single-shot compressed ultrafast photography at one hundred billion frames per second", Nature, vol. 516, pp. 74-77, Dec. 4, 2014.
Edgar, et al., "Principles and prospects for single-pixel imaging", Nature Photonics (2018).
Duarte, et al., "Single-pixel imaging via compressive sampling", IEEE signal processing magazine, pp. 83-91, 2008.

* cited by examiner

TIME-RESOLVED HYPER-SPECTRAL SINGLE-PIXEL IMAGING

CROSS-REFERENCE TO RELATED APPLICATIONS

This application claims priority to foreign European patent application No. EP 19315037.2, filed on May 20, 2019, the disclosure of which is incorporated by reference in its entirety.

FIELD OF THE INVENTION

The present invention relates to an imaging system suitable for carrying out imaging in 4 dimensions (2D spatial resolution, temporal resolution and spectral resolution) and more particularly hyperspectral imaging with a picosecond resolution.

BACKGROUND

Time-resolved hyper-spectral imaging possesses a great number of applications in a multitude of different fields ranging from characterization of biological tissues to the study of the environment. Optical techniques such as timed-resolved fluorescence imaging or fluorescence-lifetime imaging microscopy (FLIM) for example require images of an extensive area to be acquired with a sub-nanosecond temporal resolution. Specifically, in FLIM the fall time of the fluorescence effect must be measured on the picosecond or nanosecond scale in order to obtain maps of fluorescence lifetime. Fluorescence imaging is one of the most used imaging techniques in biology and the study of materials because it allows information to be obtained on variations in the pH, temperature and ion concentration of the studied sample.

Beyond temporal resolution, the acquisition of an emission spectrum of the sample is essential to study of the photo-physical properties of a sample. For example, spectral information may be used to differentiate certain chromophores within a sample, when using biological marking.

There are currently few imaging systems that are spectrally and temporally resolved with a temporal resolution ranging from about ten picoseconds to one nanosecond. It is known practice to use linear detectors coupled to a spectrometer and a time-correlated single-photon counting (or TCSPC) system. In order to construct an image it is however necessary to scan the sample. On account of the number of wavelength channels of the spectrometer, this technique only allows multi-spectral and not hyper-spectral imaging to be carried out.

To clarify, here an imaging system is considered to be hyper-spectral when it allows more than 20 separate wavelengths to be observed.

It is known practice to produce single 2D images with a nanosecond temporal resolution using intensified CCD cameras employing electronic gating, allowing a rapid shutter speed to be obtained. Their temporal resolution is limited by the intrinsic response time of the instrumentation. In addition, the read time of the camera limits the temporal sampling. Spectral information may then be obtained via sequential measurements at various emission wavelengths. Likewise, strips of single-photon avalanche diodes allow a temporal resolution of about 50 picoseconds to be obtained. However, they possess a limited spatial resolution due to the low number of pixels (~32×32 pixels), a low fill factor (~5%) and a high read time.

There is therefore no satisfactory imaging system allowing time-resolved hyper-spectral imaging to be carried out with a picosecond temporal resolution, to observe repeatable events.

To solve some of the problems of the prior art, one subject of the invention is a time-resolved hyper-spectral imaging system for imaging a repeatable event with a picosecond resolution using single-pixel imaging combined with a dispersive system and a streak camera.

Single-pixel (SP) imaging is a technique that produces images by illuminating a scene with light structured by successively applying diverse spatial patterns, and by measuring the total light intensity reflected or transmitted by the scene in correspondence with each spatial pattern. As a variant, it is possible to not use structured light, but to spatially modulate, by means of the same spatial patterns, the light reflected or transmitted by the scene. Single-pixel imaging uses a spatial light modulator (SLM)—in order to generate SLM patterns—combined with a detector without spatial resolution. This method essentially consists in measuring the scalar product of the scene and of a sequence of SLM patterns. Using methods for post-processing the acquired data, it is possible to reconstruct an image of the scene. The strategies used to reconstruct the scene are for example compressed-acquisition techniques, basis scans or adaptive basis scans. Compressed-acquisition techniques theoretically allow a better reconstruction resolution to be obtained but however require a high computing time. Scans of a preset (Hadamard, Fourier, wavelet, discrete-cosine-transform) basis allow the image to be reconstructed via fast inverse transformation but require a high number of SLM patterns and therefore a long acquisition time. Just like basis scans, adaptive basis scans allow the image to be rapidly reconstructed, and decrease the required acquisition time by selecting only the SLM patterns that contain the most information.

This imaging technique allows images to be reconstructed with a good spatial resolution. In addition, it is particularly suitable for time-resolved imaging when associated with a streak camera allowing the intrinsic limitation of the read time of CCD cameras to be overcome (see for example Liang, Jinyang, et al. "Encrypted three-dimensional dynamic imaging using snapshot time-of-flight compressed ultrafast photography." Scientific reports 5 (2015): 15504). It allows transient effects to be imaged with resolutions of about ten picoseconds (see for example Gao, Liang, et al. "Single-shot compressed ultrafast photography at one hundred billion frames per second." Nature 516.7529 (2014): 74). Using a spectrometer coupled to a TCSPC system and an SP imaging setup it is also possible to carry out time-resolved multispectral SP imaging with a sub-nanosecond resolution (see Rousset, Florian, et al. "Time-resolved multispectral imaging based on an adaptive single-pixel camera." Optics express 26.8 (2018): 10550-10558). However, currently, no SP imaging device allows hyper-spectral imaging to be carried out with a picosecond temporal resolution.

Because the measurements with various SLM patterns require repetition to reconstruct an image of the scene, it is clear that SP imaging is particularly suitable for the observation of repeatable luminous effects or events. Thus, FLIM imaging is an ideal candidate for SP imaging provided that a sufficiently good temporal resolution is obtained.

In addition, as mentioned above, obtaining a spectral resolution is key to determining certain critical parameters of the studied sample.

Also, the time-resolved hyper-spectral imaging system with a picosecond resolution of the invention uses single-pixel imaging combined with a dispersive system to obtain a spectral resolution and a streak camera to obtain a temporal resolution.

Compared to a confocal microscopy system provided with a streak camera to obtain a temporal resolution, the SP imaging system associated with a streak camera of the invention allows the entirety of the radiation emitted by the sample to be used.

SUMMARY OF THE INVENTION

Thus, one subject of the invention is a time-resolved hyper-spectral imaging system for imaging a sample, comprising: a radiation source suitable for illuminating the sample repeatably, a first optical system configured to form an image I of the sample on a spatial light modulator forming a transmission or reflection mask P, a processor connected to the spatial light modulator and configured to make the transmission or reflection mask P vary for each repetition of the illumination, a second optical system suitable for focusing the radiation transmitted or reflected by the spatial light modulator so as to form, in its image focal plane, a partial image S=P·I;

said imaging system being characterized in that it comprises:
a dispersive device comprising a slit placed in the image focal plane of the second optical system, said dispersive device being suitable for spatially splitting the various wavelengths of the radiation transmitted or reflected by the spatial light modulator;
a streak camera arranged so as to be illuminated by the radiation issued from the dispersive device and configured to acquire a plurality of time-resolved partial images of the sample, said images being associated with respective and different transmission or reflection masks, said streak camera being connected to the processor and said processor also being configured to combine said partial images of the sample so as to construct a 4D image cube forming an image resolved in time and in wavelength of the sample.

According to particular embodiments of the invention:
the imaging system comprises a third optical system suitable for focusing the radiation coming from the radiation source onto the sample and for collecting the radiation issuing from the sample, said imaging system moreover comprising a beamsplitter arranged so as to split the radiation coming from the sample and the radiation coming from the radiation source;
the imaging system comprises a linear stage suitable for moving the sample along the optical axis of the third optical system;
the dispersive device comprises a diffraction grating;
the streak camera and the dispersive system are suitable for simultaneously acquiring partial images with more than 20 different wavelength channels;
the radiation source is connected to the processor so that the repetition of the illumination emitted by the radiation source is synchronized with the change of the transmission or reflection mask of the spatial light modulator;
the spatial light modulator is a digital micromirror device, forming a binary reflective intensity mask;
the processor is configured so that the binary reflection masks of the digital micromirror device that are associated with the partial images of the sample that are combined to form the image resolved in time and in wavelength of the sample form a Hadamard, Fourier or wavelet basis;
the processor is configured to combine said partial images of the sample so as to construct a 4D cube forming an image resolved in time and in wavelength of the sample by implementing a matching-pursuit or basis-pursuit algorithm;
the radiation source is a pulsed source;
the radiation source is a laser source, a laser diode for example.

Another subject of the invention is a time-resolved hyper-spectral imaging method for imaging a sample, comprising the following steps:
a. illuminating the sample with a radiation source;
b. forming the image of the sample with a first optical system on a spatial light modulator forming a transmission or reflection mask P;
c. focusing the radiation transmitted or reflected by the spatial light modulator using a second optical system onto a dispersive device, and spatially splitting the various wavelengths of the radiation transmitted or reflected by the spatial light modulator using said dispersive device;
d. acquiring, using a streak camera arranged so as to be illuminated by the radiation issuing from the dispersive device, a time-resolved partial image S=P·I of the sample, which image is associated with one transmission or reflection mask P;
e. repeating steps a) to c) while varying the binary transmission or reflection mask P of the spatial light modulator using a processor connected to the spatial light modulator, in order to acquire, with the streak camera, a plurality of time-resolved partial images of the sample, said images being associated with respective transmission or reflection masks P;
f. combining, using a processor connected to the streak camera, said respective time-resolved partial images of the sample so as to construct a 4D cube forming an image resolved in time and in wavelength of the sample.

BRIEF DESCRIPTION OF THE DRAWINGS

Other features, details and advantages of the invention will become apparent on reading the description, which is given with reference to the appended drawings, which are given by way of example and show, respectively.

Below, when the same references are used in more than one figure, they designate the same elements.

DETAILED DESCRIPTION

Figure 1:
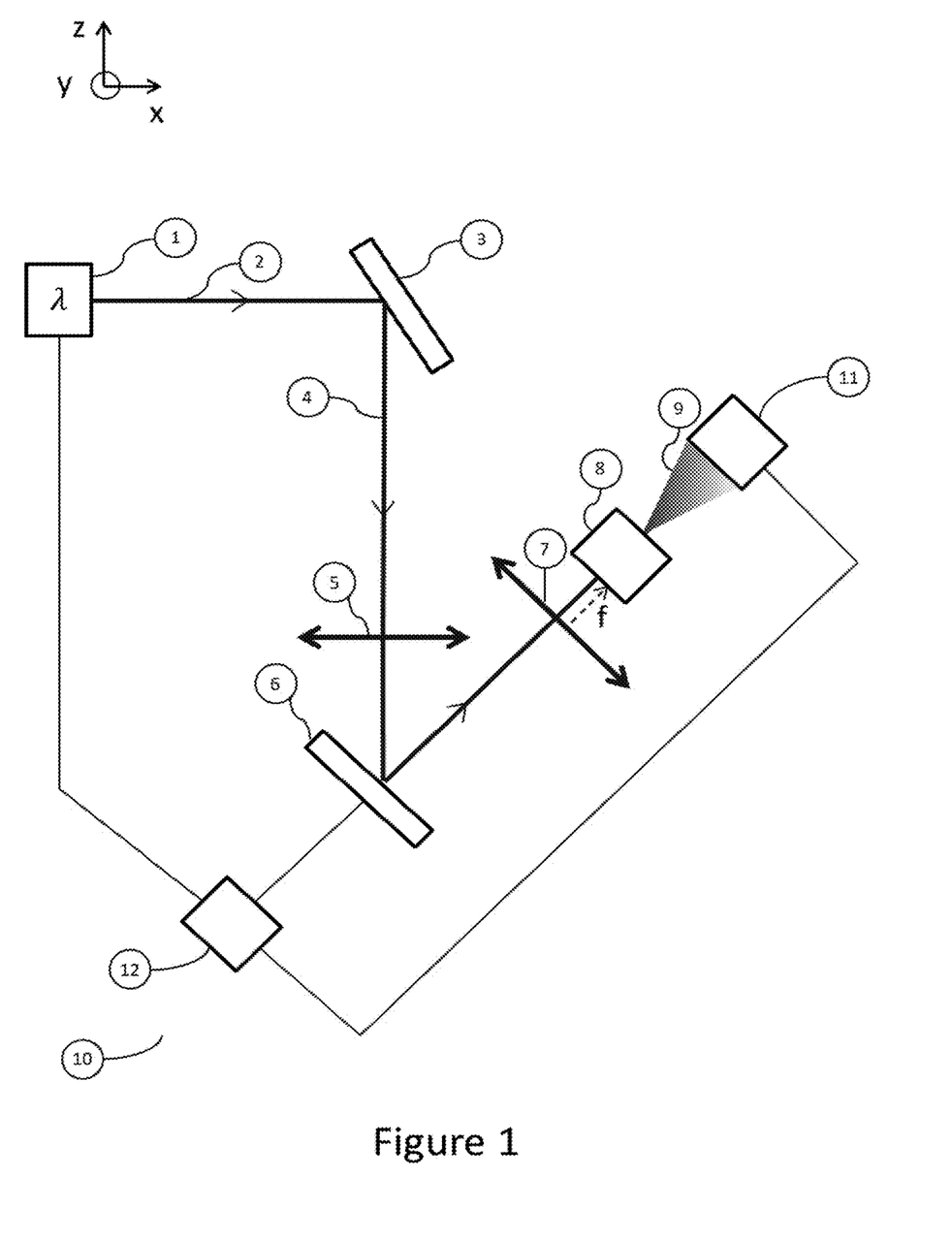
FIG. 1, a schematic view of a time-resolved hyper-spectral imaging system for imaging a sample according to a first embodiment of the invention.

FIG. 1 illustrates a schematic view of a time-resolved hyper-spectral imaging system 10 for imaging a repeatable event according to a first embodiment of the invention. The system comprises a radiation source 1. In the embodiment of FIG. 1, this source is a pulsed source of monochromatic radiation such as a solid-state laser. The laser source is connected to a processor that is configured to control the synchronization of the laser pulse with the rest of the system. In another embodiment, the radiation source is continuous-wave and intensity-modulated. In another embodiment, the radiation source may be a vapour lamp.

The radiation 2 generated by the source 1 illuminates a sample 3. This sample may absorb the incident radiation 2 and emit a photoluminescence signal 4 or quite simply reflect or transmit some of the incident radiation 2. In the embodiment of FIG. 1, the sample emits a polychromatic photoluminescence signal or radiation 4 after having absorb some of the incident radiation 2.

Below, the event that it is desired to resolve temporally and spectrally is considered to be a repeatable event, the effect being triggered again with a new laser pulse for example.

Below, the expressions radiation emitted by the sample, radiation transmitted by the sample and radiation reflected by the sample are considered to be equivalent.

The radiation emitted by the sample 4 is focused by a first optical system 4 onto a spatial light modulator (SLM) 6, which is located in the image focal plane of the optical system. This optical system 4 is an optical objective. Preferably, it possesses a high numerical aperture. It may be a single lens, for example a convergent biconvex lens, or a convergent complex set of lenses. The optical system therefore forms an image I of the sample 3 in its image focal plane.

The SLM is configured to form a binary reflection or transmission intensity mask P. In the embodiment of FIG. 1, this SLM 6 is a digital micromirror device (DMD).

By way of example, the DMD of the imaging system 10 consists of 1024×768 side-by-side micro-mirrors, the side length of each mirror being about 13 µm. The mirrors are controllable electrostatically and may be inclined (state "1") or not (state "0") by a fixed angle with respect to the normal to the DMD, in general by an angle of 12°, the radiation reflected by the mirrors in state 1 making an angle of 24° to the incident radiation 4.

Since the mirrors in state 1 are coupled to the rest of the optical setup, they have a reflection coefficient equal to 1, the mirrors in state 0 corresponding to a reflection coefficient of zero. Thus, the DMD forms a controllable binary intensity mask.

The inclination of the micro-mirrors and therefore the pattern of the binary mask P of the DMD is controllable by a processor 12 connected to the DMD.

In another embodiment the SLM is a device based on liquid crystals able to operate in transmission or in reflection and forming a binary intensity mask P.

The imaging system 10 comprises a second optical system 7 of focal length f, suitable for focusing the radiation transmitted or reflected by the spatial light modulator so as to form, in its image focal plane, a partial image of the sample S=P·I.

In the image focal plane of the second optical system, the imaging system 10 comprises a dispersive device 8 allowing the various wavelengths of the radiation to be spatially split and thus a spectral resolution to be obtained. This dispersive device is coupled to a streak camera 11 allowing a temporal resolution to be obtained.

In the embodiment of FIG. 1, this dispersive system is composed of a slit placed in the image focal plane of the second optical system, of a plurality of mirrors and of a diffraction grating, which are arranged so as to spatially split the various wavelengths of the radiation in a defined xz-plane. The z-direction is the optical axis of the first optical system. Thus, on exiting the dispersive system, each wavelength of the radiation 9 propagates simultaneously in a different direction located in the xz-plane. A schematic view of the dispersive device 8 and of the streak camera 11 is illustrated in FIG. 2.

The slit 21, the direction of the slit being the y-direction, is placed in the focal plane of the second optical system 7, acts as a spatial filter and allows the beam to be cleaned by removing scatter of the radiation emitted by the source 1. A first collimating mirror 22 allows the radiation to be directed toward a reflective diffraction grating 23. The diffraction grating allows the various wavelengths of the radiation in the reflective radiation 9 to be spatially split, each wavelength possessing a different propagation direction located in the same horizontal xz-plane. A second mirror 24 allows the radiation to be directed toward the streak camera 11.

Figure 2:
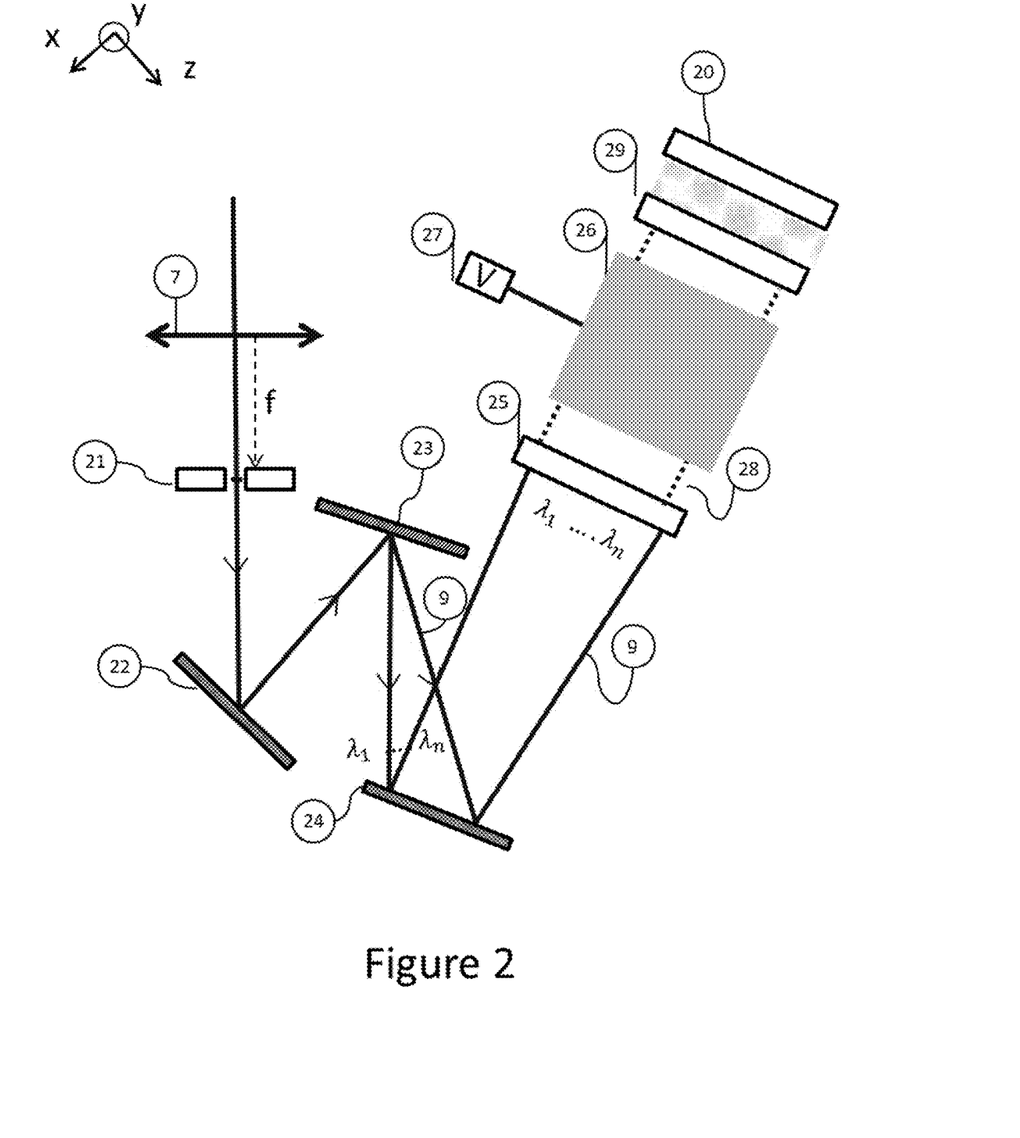
FIG. 2, a schematic view of the dispersive device end of the streak camera of the imaging system of FIG. 1.

As illustrated in FIG. 2, the streak camera comprises a photocathode 25. The radiation 9 striking the photocathode produces, via the photoelectric effect, electrons that are accelerated by an electric field generated between two deviation plates 26 that are connected to a voltage generator 27. The electrons are diverted vertically in a direction y parallel to the normal to the deviation plates under a variable electric field. By modulating the voltage difference between the plates 26, the electric field rapidly varies, thus providing a deviation of the electrons that varies over time. The later the time at which the electrons arrive between the deviation plates, the higher the electric field, which thus produces a greater vertical movement. The deviation of the electrons is imaged using a microchannel plate (MCP), which allows the number of deviated electrons to be multiplied, and a phosphorus screen 29. The impacts of the electrons on the phosphorus screen are observed using a two-dimensional sensor 20, a CCD sensor for example.

The voltage generator 27 is connected to the processor in order to synchronize the variation in the electric field between the deviation plates of the streak camera with the laser pulse emitted by the source 1 of laser radiation.

The vertical axis of the CCD camera therefore allows the dynamic behaviour of the partial image S of the sample, which image is associated with the binary reflection mask P, to be temporally resolved and the horizontal axis allows the partial image to be split wavelengthwise and therefore the sample or the luminous event to be viewed hyper-spectrally.

The temporal resolution is set by the CCD sensor and the scan frequency of the voltage of the streak camera; it is typically about 1 picosecond with a set scan frequency and about 15 picoseconds with a variable scan frequency. It will be noted that when the duration of the laser pulse is greater than the temporal resolution of the streak camera, then it is this duration that sets the temporal resolution of the imaging system.

The spectral resolution is set by the diffraction grating, provided that the pixel size of the CCD camera is smaller than the minimum wavelength resolution of the diffraction grating.

The number of temporal channels T detectable by the imaging system 10 is set by the vertical dimension of the CCD sensor. The number A of wavelength channels simultaneously detectable by the imaging system 10 is set by the horizontal dimension of the CCD sensor. By suitably choosing the sensor, it is therefore possible to carry out hyperspectral imaging, i.e. to simultaneously image 20 or more channels of wavelengths of the photoluminescent radiation issuing from the sample.

As briefly explained above, the complete reconstruction of the image of the repeatable event or of the sample requires a plurality M of measurements to be performed in order to acquire, with the streak camera 11, a plurality M of partial images $S_1, \ldots, S_M$, which are associated with distinct respective binary transmission or reflection masks $P_1, \ldots, P_M$ of the same event or of the sample. The partial images $S_1, \ldots, S_M$ are obtained by illuminating the sample with a new light pulse emitted by the radiation source 1, by changing the binary mask P of the DMD between each pulse using the processor and by carrying out a new acquisition with the streak camera. As mentioned above, the radiation source, the DMD and the streak camera all being connected to the processor, the latter is configured to suitably synchronize the light pulse, the change of the binary mask of the DMD and the acquisition by the streak camera.

When a sufficient number of partial images associated with distinct binary patterns has been acquired, it is possible to reconstruct a complete image $I_{tot}$ of the sample by post-processing. The reconstructed image is a 4D image cube $I(x, y, \lambda, t)$, with (x, y) the spatial coordinates of the image, $\lambda$ the wavelength and t time. The image cube $I_{tot} \in \mathbb{R}^{N \times N \times \Lambda \times T}$ of N×N pixels is defined, T being the number of temporal channels detected with the streak camera and $\Lambda$ being the number of wavelength channels detected with the streak camera, where $I_{tot} = (I_{1,1}, \ldots, I_{\lambda,t}, \ldots, I_{\Lambda,T})$, $I_{\lambda,T} \in \mathbb{R}^{N \times N}$ is the reconstructed image corresponding to the $\lambda$-th spectral channel and to the t-th temporal channel measured. The partial image or signal measured by the m-th binary pattern is denoted $S_m \in \mathbb{R}^{1 \times \Lambda T}$. The binary patterns $P_1, \ldots, P_M$ associated with the M measurements providing partial images $S_1, \ldots, S_M$ of the sample form a matrix $P_{tot} = (P_1; \ldots; P_M)$ with $P_{tot} \in \mathbb{R}^{M \times N \times N}$. Writing $S_{tot} = (S_1; \ldots; S_M)$, $S_{tot} \in \mathbb{R}^{M \times \Lambda T}$ then:

$$S_{tot} = P_{tot} \cdot I_{tot}. \quad [\text{Math. 1}]$$

In the embodiment, the processor 12 is configured to carry out this post-processing step and to combine the partial images of the sample so as to construct the 4D image cube $I_{tot}$ forming a time- and wavelength-resolved image of the sample, i.e. to invert the equation [Math. 1].

A plurality of image-reconstruction methods suitable for SP imaging are known and may be applied to the invention. See for example: Duarte, Marco F., et al. "Single-pixel imaging via compressive sampling." *IEEE signal processing magazine* 25.2 (2008): 83-91, or indeed Edgar, Matthew P., Graham M. Gibson, and Miles J. Padgett. "Principles and prospects for single-pixel imaging." *Nature Photonics* (2018): 1.

In the embodiment of FIG. 1, the binary patterns $P_1, \ldots, P_M$ associated with the M measurements providing partial images $S_1, \ldots, S_M$ of the sample, which images are combined to form the complete time- and wavelength-resolved image $I_{tot} = (I_{1,1}, \ldots, I_{\lambda,t}, \ldots, I_{\Lambda,T})$, are advantageously chosen so as to form a Hadamard, Fourier or wavelet basis. The processor is then configured so that the sample is scanned by the binary patterns using a predefined basis or an adaptive basis. The advantage of performing a scan using an adaptive basis is that it decreases the acquisition time required by selecting only the binary patterns that contain the most spatial information. In the case of a scan using an adaptive basis, the processor is configured to extract spatial information from the sample during the acquisition of partial images in order to determine which binary patterns are most suitable for representing the sample. The complete image is then reconstructed using the processor via a suitable inverse transformation. These methods possess the advantage of the image being rapidly reconstructed algorithmically using a suitable inverse transform, but in general require a high number of patterns and therefore a long acquisition time.

In another embodiment, the processor may be configured so that the binary patterns associated with the partial images are pseudo-random, the processor being able to reconstruct the complete time-resolved image by implementing a compressed-acquisition algorithm ($l_1$-minimization) such as matching pursuit or basis pursuit. These methods have the advantage of allowing reconstruction with a lower number of patterns than with scanning methods based on a predefined basis or adaptive basis, and therefore require a shorter acquisition time. However, they require greater computing power and substantial computing time.

It is also possible to track a given point of interest of the sample with adaptive pseudo-random binary patterns. This may be useful in the characterization of photovoltaic cells for example, in which the source of photoluminescent (PL) illumination is point-like and may be considered to be radially symmetric. The use of a radial basis of binary patterns thus allows the number of acquisitions performed to be decreased. The centre of a PL source in the sample is determined by observing the variation in the intensity acquired by the streak camera, by integrating an image with respect to wavelength and time and by activating in turn different regions of the DMD by using a dichotomy system.

Thus, when the sample has particular properties (centrosymmetric, a low total variation norm, etc.) it is necessary to perform about M=N×log (N) measurements with distinct binary patterns $P_1, \ldots, P_M$ with $P_i \in \mathbb{R}^{N \times N}$ to reconstruct an image of N×N pixels, the pixel size being set by the DMD. Otherwise, it is in general necessary to perform N×N measurements.

Figure 3:
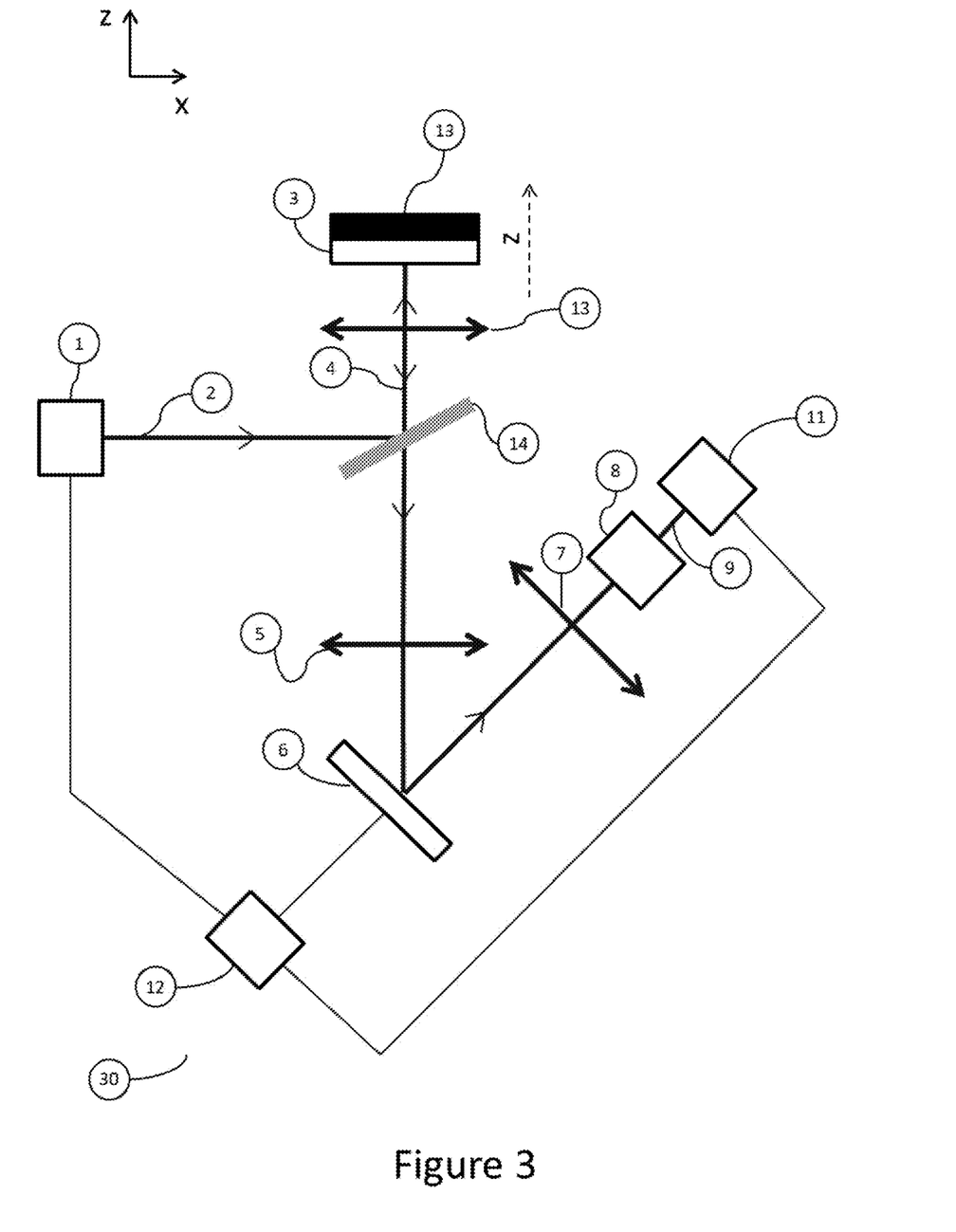
FIG. 3, a schematic view of a time-resolved hyper-spectral imaging system for imaging a sample according to a second embodiment of the invention.

FIG. 3 illustrates an imaging system 30 according to a second embodiment of the invention similar to that of FIG. 1, with the exception that it comprises a beamsplitter 14 arranged so as to split the radiation coming from the sample and the radiation coming from the radiation source. The beamsplitter may be a plate beamsplitter.

The imaging system 30 in addition comprises a third optical system 13 suitable for focusing the radiation coming from the radiation source onto the sample, the sample being placed in the focal plane of the third optical system. In order to easily control the position of the sample in the focal plane of the third optical system, the sample is fastened to a linear stage suitable for moving the sample along the optical axis of the third optical system (which is represented by the direction z in FIG. 3). The third optical system is an objective optical system similar to those used in confocal microscopy for example. In the embodiment of FIG. 3, it possesses a high numerical aperture. It may be a single lens, for example a convergent biconvex lens, or a convergent complex set of a plurality of lenses.

Comparatively to the imaging system of the embodiment of FIG. 1, the imaging system of the embodiment of FIG. 3 allows a larger amount of the light flux emitted/transmitted/reflected by the sample to be collected.

Figure 4A:
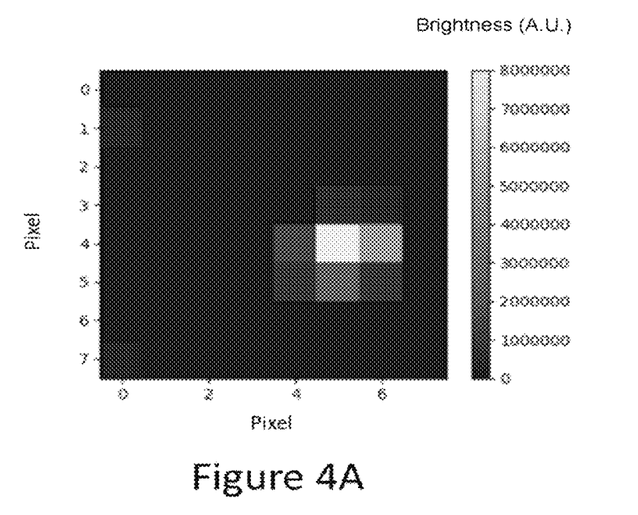
FIG. 4A an image integrated with respect to wavelength and time of a signal of photoluminescence brightness of a point source, and FIG. 4B an image of the time-resolved and wavelength-resolved variation in the photoluminescence signal of the brightest pixel of FIG. 4A.
Figure 4B:
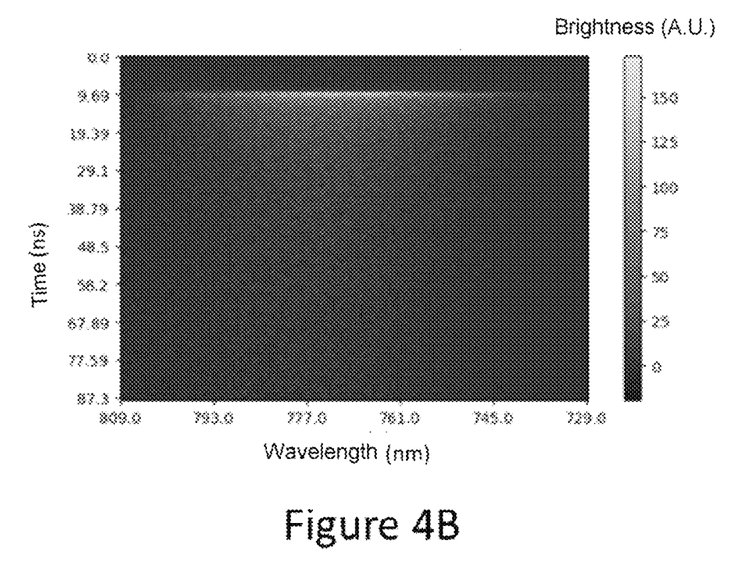

FIG. 4A illustrates an image of a PL signal originating from a point source acquired with the imaging system of the embodiment of FIG. 3 and integrated with respect to wavelength and time. By determining the centre of the point source and by scanning around this point, a 4D image of the point source may be reconstructed. To make viewing easier, FIG. 4A shows the reconstructed image of the point source integrated with respect to wavelength and time. FIG. 4B shows the variation in the PL signal as a function of time and as a function of wavelength for the brightest pixel in FIG. 4A. This pixel corresponds to the centre of the point source. By cutting horizontal sections through FIG. 4B for various time values, it is possible to observe the variation in the spectrum over time of the signal of the central pixel.

In another embodiment the SLM is configured to form a non-binary reflection or transmission intensity mask. A non-binary mask allows the step of reconstructing the image of the sample to be accelerated. Alternatively, the mask may be a phase mask.

The invention claimed is:

1. A time-resolved hyper-spectral imaging system for imaging a sample, comprising: a radiation source suitable for illuminating the sample repeatably, a spatial light modulator forming a transmission or reflection mask P, a first optical system configured to form an image I of the sample on a spatial light modulator, a processor connected to the spatial light modulator and configured to make the transmission or reflection mask P vary for each repetition of the illumination, a second optical system suitable for focusing the radiation transmitted or reflected by the spatial light modulator so as to form, in its image focal plane, a partial image S=P·I, said imaging system being wherein it comprises:
a dispersive device comprising a slit placed in the image focal plane of the second optical system, said dispersive device being suitable for spatially splitting the various wavelengths of the radiation transmitted or reflected by the spatial light modulator;
a streak camera arranged so as to be illuminated by the radiation issuing from the dispersive device and configured to acquire a plurality of partial images resolved in time and in wavelength of the sample, said images being associated with respective and different transmission or reflection masks P, said streak camera being connected to the processor and said processor also being configured to combine said partial images of the sample so as to construct a 4D image cube $I_{tot}$ forming an image resolved in time and in wavelength of the sample.

2. The imaging system according to claim 1, comprising a third optical system suitable for focusing the radiation coming from the radiation source onto the sample and for collecting the radiation issuing from the sample, said imaging system moreover comprising a beamsplitter arranged so as to split the radiation coming from the sample and the radiation coming from the radiation source.

3. The imaging system according to claim 2, comprising a linear stage suitable for moving the sample along the optical axis of the third optical system.

4. The imaging system according to claim 1, wherein the dispersive device comprises a diffraction grating.

5. The imaging system according to claim 1, wherein the streak camera and the dispersive system are suitable for simultaneously acquiring partial images with more than 20 different wavelength channels.

6. The imaging system according to claim 1, wherein the radiation source is connected to the processor so that the repetition of the illumination emitted by the radiation source is synchronized with the change of the transmission or reflection mask of the spatial light modulator.

7. The imaging system according to claim 1, wherein the spatial light modulator is a digital micromirror device, forming a binary reflective intensity mask.

8. The imaging system according to claim 7, wherein the processor is configured so that the binary reflection masks of the digital micromirror device that are associated with the partial images of the sample that are combined to form the image resolved in time and in wavelength of the sample form a Hadamard, Fourier or wavelet basis.

9. The imaging system according to claim 8, wherein the processor is configured to combine said partial images of the sample so as to construct a 4D cube forming an image resolved in time and in wavelength of the sample by implementing a matching-pursuit or basis-pursuit algorithm.

10. The imaging system according to claim 1, wherein the radiation source is a pulsed source.

11. The imaging system according to claim 1, wherein the radiation source is a laser source, a laser diode for example.

12. A time-resolved hyper-spectral imaging method for imaging a sample, comprising the following steps:
a. illuminating the sample with a radiation source;
b. forming the image of the sample with a first optical system on a spatial light modulator forming a transmission or reflection mask P;
c. focusing the radiation transmitted or reflected by the spatial light modulator using a second optical system onto a dispersive device, and spatially splitting the various wavelengths of the radiation transmitted or reflected by the spatial light modulator using said dispersive device;
d. acquiring, using a streak camera arranged so as to be illuminated by the radiation issuing from the dispersive device, a time-resolved partial image S=P·I of the sample, which image is associated with one transmission or reflection mask P;
e. repeating steps a) to c) while varying the binary transmission or reflection mask P of the spatial light modulator using a processor connected to the spatial light modulator, in order to acquire, with the streak camera, a plurality of time-resolved partial images of the sample, said images being associated with respective transmission or reflection masks P;
f. combining, using a processor connected to the streak camera, said respective time-resolved partial images of the sample so as to construct a 4D cube $I_{tot}$ forming an image resolved in time and in wavelength of the sample.

* * * * *